United States Patent [19]

Chen

[11] Patent Number: 4,824,902

[45] Date of Patent: Apr. 25, 1989

[54] LATEX COMPOSITION COMPRISING POLYCARBONATE HAVING TERTIARY AMINE ACID ADDITION MOIETY

[75] Inventor: Tsang J. Chen, Rochester, N.Y.

[73] Assignee: Eastman Kodak Company, Rochester, N.Y.

[21] Appl. No.: 91,249

[22] Filed: Aug. 31, 1987

[51] Int. Cl.[4] .............................................. C08G 63/62
[52] U.S. Cl. ..................................... 524/611; 528/203
[58] Field of Search ......................... 524/611; 528/203

[56] References Cited

U.S. PATENT DOCUMENTS

| | | | |
|---|---|---|---|
| 3,161,615 | 12/1964 | Goldberg | 260/47 |
| 3,894,991 | 7/1975 | Neuray et al. | 260/47 |
| 4,214,047 | 7/1980 | Chen | 430/448 |
| 4,608,310 | 8/1986 | Chen | 428/412 |
| 4,737,570 | 4/1988 | Chen | 528/203 |

Primary Examiner—Harold D. Anderson
Attorney, Agent, or Firm—John R. Everett

[57] ABSTRACT

Novel polycarbonate latex compositions comprising 0.1 to 30 mole percent of recurring units containing a carboxyl or a tertiary amine acid addition salt component are disclosed.

The latex compositions are made by:
(a) preparing a polycarbonate comprising from about 0.1 to 30 mole percent of recurring units having a carboxyl or a tertiary amine acid addition component;
(b) dissolving the polycarbonate in a water miscible solvent having a boiling point below about 100° C.;
(c) blending the solution of (b) with water; and
(d) removing the water-miscible solvent.

7 Claims, No Drawings

LATEX COMPOSITION COMPRISING POLYCARBONATE HAVING TERTIARY AMINE ACID ADDITION MOIETY

This is a division of application Ser. No. 836,924, filed Mar. 6, 1986, now U.S. Pat. No. 4,737,570.

FIELD OF THE INVENTION

This invention relates to novel polycarbonates, novel polycarbonate latex compositions, novel methods of making such compositions and the use of such compositions in elements.

BACKGROUND OF THE INVENTION

Polycarbonates are known as being tough and having good film-forming properties which result in tough, strong polymer layers. Some polycarbonates having recurring carboxyl components are used in applications requiring hardness, elasticity and flexibility. Other polycarbonates having recurring alkylidene diphenylene components are used as binders in electrophotographic layers or as supports in silver halide containing photographic elements.

However, polycarbonates are hydrophobic and layers of polycarbonates are generally coated from organic solvents. Coating from organic solvents results in layers which are impermeable to water. Such layers are unsuited for use in hydrophilic photographic layers.

Emulsification of polycarbonates using surfactants and water-immiscible organic solvents or direct mechanical shearing of water-polycarbonate mixtures at high temperatures require excessive amounts of surfactants, or risk degradation and decomposition of the polycarbonate dispersions. The problem is that the particle size of the polycarbonates in such emulsions is so large as to be unsuitable for use in the hydrophilic layers such as are used in photographic elements.

SUMMARY OF THE INVENTION

The present invention provides novel latex compositions comprising an aqueous continuous phase having dispersed therein polycarbonate particles characterized in that
(a) the polycarbonate comprises from about 0.1 to 30 mole percent of recurring units having a carboxyl or a tertiary amine acid addition salt component, and
(b) the polycarbonate particles are less than about 0.3 μm in diameter.

The size of the polyester particles make the latex compositions suitable for use in hydrophilic layers. Thus, the novel latex compositions of the present invention provide tough hydrophilic film forming polycarbonate layers which are compatible with the hydrophilic emulsion layers used in elements such as photographic elements. The latex compositions are relatively positive (anionic) or negative (cationic), depending upon whether a carboxyl or a tertiary amine acid addition component is present in the polymer. Thus, the composition is useful in photographic elements which require compatibility with either negative or positive addenda.

The latex compositions are prepared by a novel method comprising the steps of:
(a) preparing a polycarbonate comprising from about 0.1 to 30 mole percent of recurring units having a carboxyl or a tertiary amine acid addition salt component;
(b) dissolving the polycarbonate in a water-miscible solvent having a boiling point below about 100° C.;
(c) blending the solution of (b) with water; and removing the water-miscible solvent.

No surfactants need be used in forming the latex composition. However, for some coating processes, surfactants are useful. In the latter cases no more than 3% by weight of surfactant, based on the total weight of the polycarbonate, should be mixed with the latex.

The polycarbonates having recurring tertiary amine components which are useful in the latex compositions and in the method of making such compositions are novel.

In a preferred embodiment, the polycarbonates included in the latex composition have the stucture

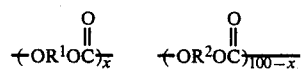

wherein
X is 0.1 to 30 mole percent;
$R^1$ represents a divalent organic group having a carboxyl or a tertiary amine component, and
$R^2$ represents the divalent residue of any nonionic condensed diol.

DETAILED DESCRIPTION OF THE INVENTION

The polycarbonate polymers, including the novel polycarbonate polymers having the recurring tertiary amine acid addition salt component used in the preparation of the latex compositions of the invention are prepared by direct phosgenation or other well known procedures such as transesterification and polycondensation. Phosgenation was used for the preparation of polycarbonates described in this invention. Phosgenation is carried out simply by contacting a solution of the starting materials with gaseous phosgene.

Useful diols for making the polycarbonates include alkylene glycols, including dialkylene glycols, cyclic diols and trialkylene glycols and other diols well known in the art.

Useful cyclic diols for forming the $R^2$ residue include bisphenol A; 4,4'-biphenyl; 1,4-cyclohexanediol; 1,4-cyclohexanedimethanol; hydroquinone; 1,4-cyclohexanediethanol; 4,4'-oxybisphenol; 2,7-naphthalenediol; 1,4-bis(2-hydroxyethoxy)cyclohexane; 2,3-norbornanedimethanol; 1,4-benzenedimethanol and 1,4-benzenediethanol.

Useful alkylene glycols for the $R^2$ residue inlcude ethylene glycol; diethylene glycol; triethylene glycol; 1,2-propanediol; 1,3-propanediol; 1,4-butanediol; 2,3-butanediol; 1,5-pentanediol; 1,6-hexanediol; 1,7-heptanediol; 1,8-octanediol; 1,9-nonanediol; 1,10-decanediol; 1,12-dodecanediol; 2,2,4-trimethyl-1,16-hexanediol; 4-oxa-2,6-heptanediol and neopentyl glycol.

Useful starting materials for forming $R^1$ having a carboxyl component include dihydroxy-substituted carboxylic acids, including aliphatic, alicyclic, and aromatic carboxylic acids including ammonium and alkali metal salts thereof such as 2,2-bis(hydroxymethyl)propionic acid, 1,2-dihydroxypropionic acid, α-resorcyclic acid, β-resorcylic acid (2,4-dihydroxybenzoic acid), γ-resorcyclic acid (2,6-dihydroxybenzoic acid), gentisic acid (2,5-dihydroxybenzoic acid), gentisinic acid, mesoxalic acid, 2,4-dihydroxycinnamic acid, dihydroxytartaric acid, and their salts.

Useful starting materials for forming $R^2$ having a tertiary amine component include N-methyldiethanolamine, N-phenyldiethanolaniline, 3,5-bis(hydroxymethyl)-N,N-dimethylaniline, 2,4-dihydroxypyridine; 2,6-dihydroxypyridine, 3-dimethylamino-1,2-propanediol and [bis(2-hydroxyethyl)amino]-1,2-propanediol.

In making polycarbonate latex compositions according to this invention, from 0.1 to 20%, preferably at least 2%, by weight of polycarbonate is dissolved in a water-miscilbe organic solvent. In some applications from 10 to 20% by weight of polycarbonate is dissolved. The objective is to make a composition having a total solids content of from 2 to 50%, preferably 5 to 35%. Useful water-miscible organic solvents in which the polycarbonates are soluble include dimethylformamide, dimethyl sulfoxide, tetrahydrofuran, acetone, dioxane, formic acid, phenol, and mixtures of such solvents.

Water is blended rapidly with the polycarbonate solution to insure homogeneous nucleation. The organic solvent is then removed from the blend by evaporation or other conventional means, such as dialysis or diafiltration, to form the loaded latex composition.

The polycarbonate latex compositions of this invention can be loaded with one or more hydrophobic compounds. That is, one or more hydrophobic compounds can be distributed, dissolved or otherwise associated with the polycarbonate particles of the latex composition.

The process of loading (distributing, dissolving or associating) a hydrophobic compound within the loadable polymer particles is accomplished in the following manner described in U.S. Pat. No. 4,214,047 which is expressly incorporated herein.

The hydrophobic compound (or hydrophobe) to be loaded is dissolved in a water-miscible organic solvent, and an aqueous latex consisting essentially of water as a continuous phase and loadable polymer particles as a dispersed phase is then blended into the water-miscible organic solvent containing the hydrophobe. Blending is undertaken so that the hydrophobe remains in solution and the loadable polymer particles remain dispersed. That is, separation of the hydrophobe or coagulation of the polymer particles is avoided.

By avoiding separation or coagulation of the hydrophobe or the polymer particles, a two-phase mixture is established in which the continuous phase, the mixture of water-miscible organic solvent and water, constitutes one phase and the polymer particles constitute a second phase. Initially, the hydrophobe is within the water-miscible organic solvent. In the two phase mixture resulting from blending, the hydrophobe is brought into intimate association with both the continuous and the dispersed phases. The hydrophobe is then free to distribute itself between these phases based on its relative solubilities therein. Dilution of the water-miscible organic solvent with water by blending has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles are loaded with hydrophobe. This loading procedure requires that the hydrophobe remain dissolved until associated with the polymer particle.

For a compound to be considered a hydrophobe, the compound must be essentially insoluble in distilled water at 25° C. Preferably the dissolved concentration of hydrophobe in water under these conditions should be less than 0.5 percent by weight, based on the weight of the water. Any such hydrophobe is employed in the practice of this process which can be dissolved in a liquid consisting of one or a mixture of a water-miscible organic solvents. Preferably the hydrophobe must be soluble in a concentration of at least 5 percent by weight, based on the total weight of the water-miscible organic solvent and dissolved hydrophobe. In practice minor amounts of essentially diluent materials, such as minor amounts of water commonly entrained in water-miscible solvents, are associated with the blended hydrophobe and water-miscible organic solvent; however, the hydrophobe and water-miscible organic solvent or solvents are chosen so that additional materials, such as pH or other modifiers—e.g. acid or alkali—are not required to dissolve the hydrophobe.

Specifically preferred hydrophobes, including photographic addenda, are those used to perform coupling, silver halide development, oxidized developer scavenging, spectral sensitizing or desensitizing, diffusion transfer dye image-forming and visible or ultraviolet light absorbing functions when incorporated in a silver halide photographic element. Other hydrophobes include those used in silver halide photographic elements as brighteners, antioxidants, silver halide solvents, bleachable dyes in silver-dye-bleach imaging processes and the like. All those hydrophobic photographic addenda which have been conventionally introduced into hydrophilic colloid layers of photographic elements in coupler-solvent and similar high boiling organic solvent droplets are ideally suited for use in the practice of this invention.

In terms of end photographic uses all of the hydrophobic photographic addenda useful as hydrophobes in the practice of this process can be introduced in their conventional concentrations and locations within photographic materials and elements. Such photographic materials and elements are well known to chemists skilled in the photographic arts and need not be discussed in detail herein. Photographic materials in the preparation of which the process of the present invention is especially useful include, for example, image transfer materials, physical development materials, radiographic materials, dry development systems, color-forming materials, and the like, such as are described in *Product Licensing Index*, Vol. 92, December, 1971, pages 107–110, and in British Pat. No. 923,045.

The latex compositions including the loaded latex composition, can be coated as a layer with or without a hydrophilic colloid onto a useful substrate, such as a conventional photographic support, using conventional techniques. The compositions are coated using coating hoppers and other apparatus conventionally employed in the photographic arts for forming single or multiple coatings on photographic supports. Useful coating techniques and supports are described in the *Product Licensing Index*, Vol. 92, pages 107–110, December, 1971, and the publications referred to therein.

Although these preferred embodiments are useful in the photographic industry, the present invention is not limited to photographic materials and processes, but is useful wherever it is deemed desirable to obtain a distribution of a hydrophobe through a polymeric material. Although the distribution of hydrophobe through polymeric material is generally used ultimately ih a layer on a support, other end uses are contemplated. For example, useful hydrophobes can include hydrophobic insecticides, herbicides, miticides, hormones, vitamins, enzymes and the like (which meet the requirements set out above). It will be appreciated that the end use of such loaded polyester latexes do not necessarily involve a support.

The following examples are presented to further illustrate the present invention.

EXAMPLES 1-4

Polycarbonates prepared according to Examples 1-4 are shown below in the Table.

EXAMPLE 1

Preparation of Poly(4,4'-isopropylidenebisphenylene-co-methyliminodiethylene carbonate) hydrochloride salt (Compound 1, Table I)

Phosgene was bubbled through a homogeneous solution comprising 98 g of bisphenol A (0.43 mole), 12 g of N-methyldiethanolamine (0.1 mole), 700 ml of methylene chloride and 80 ml of pyridine for a period of 6 hours at 25°-30° C. The solution was then bubbled with nitrogen overnight, diluted to 2 liters with methylene chloride, filtered to remove the salt, and then precipitated in methanol. After washing with methanol and drying in a vacuum oven at 35° C., some 109 g of fluffy white polymer were obtained. Tg=122° C.; reduced viscosity=0.39 (measured in THF at 0.25%).

EXAMPLE 2

Preparation of Poly(4,4'-isopropylidenebisphenylene-co-methyliminodiethylene-co-tetramethylene carbonate) hydrochloride salt (Compound 2, Table I)

In a 2 liter flask were placed 45.7 g of bisphenol A (0.2 mole), 45 g of 1,4-butanediol (0.5 mole), 12 g of CH$_3$N(CH$_2$CH$_2$OH)$_2$ (0.1 mole), 142 g of pyridine (1.8 mole), and 700 ml of CH$_2$CL$_2$. Phosgenation was carried out as described in Example 1. After removing the salt, and recovering the polymer from methanol, 85 g of soft semi-solid polymer were obtained.

EXAMPLE 3

Preparation of Poly(2-carboxy-2-methyl-1,3-propylen-co-4,4'-isopropylidenebisphenylene carbonate) (Compound 3, Table I)

Bisphenol A (91.32 g, 0.4 mole) and 2,2-bis(hydroxymethyl)propionic acid (13.4 g, 0.1 mole) were dried over 50 ml of toluene under vacuum at 80° C. for 10 minutes. The contents were then placed in a 2 liter flask, together with 95 g of pyridine (1.2 mole) and 700 ml of methylene chloride. Phosgene was bubbled through the solution at 25°-30° C. for a total period of about 7 hours. After bubbling with nitrogen overnight, the salt was filtered off and most of the solvent was removed on a rotary evaporator. The polymer was recovered as a white powder after repeatedly washing with methanol and drying at 45° C. in a vacuum oven.

EXAMPLE 4

Preparation of Poly(2-carboxy-1,4-phenylene-co-4,4'-isopropylidenebisphenylene carbonate (Compound 4, Table I)

In a 2 liter flask were placed 100 g of bisphenol A (0.45 mole), 10 g of dihydroxybenzoic acid (0.065 mole), 95 g of pyridine (1.2 mole), and 700 ml of CH$_2$Cl$_2$. Phosgenation was carried out as in Example 3, and the polymer was recovered in methanol as a white solid powder. The yield was 81 g.

Other representative polycarbonates prepared according to the method of the invention are also presented in the Table.

TABLE

1.
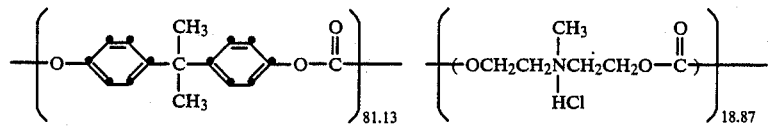

Poly(4,4'-isopropylidenebiphenylene-co-methyliminodiethylene carbonate).hydrogen chloride 2.
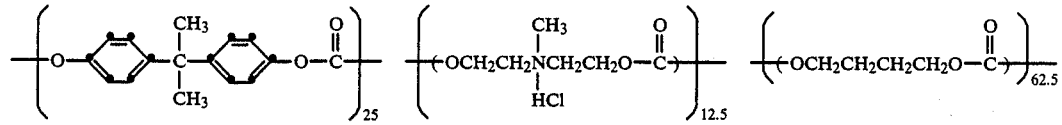

Poly(4,4'-isopropylidenebiphenylene-co-methyliminodiethylene-co-tetramethylene carbonate)hydrochloride salt 3.
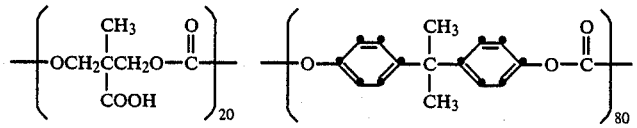

Poly(2-carboxy-2-methyl-1,3-propylene-co-4,4'isopropylidenebisphenylene carbonate TABLE-continued

4.

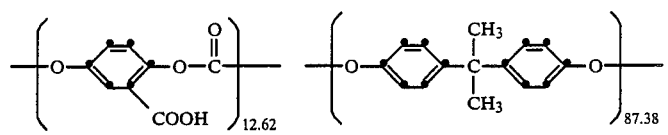

Poly(2-carboxy-1,4-phenylene-co-4,4'-isopropylidenebisphenylene carbonate)

5.

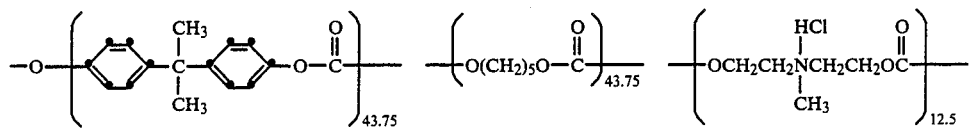

Cationic
Poly(4,4'-isopropylidenebisphenylene-co-methyliminodiethylene-co-pentamethylene carbonate).hydrogen chloride

6.

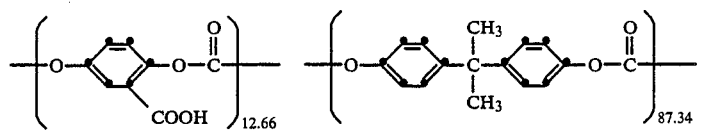

Anionic
Poly(2-carboxy-1,4-phenylene-co-4,4'-isopropylidenebisphenylene carbonate)

7.

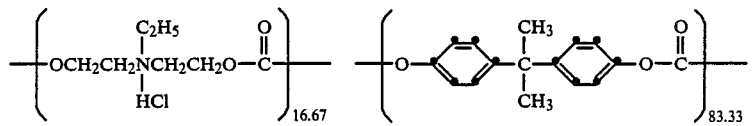

Cationic
Poly(ethyliminodiethylene-co-4,4'-isopropylidenebisphenylene carbonate).hydrogen chloride

8.

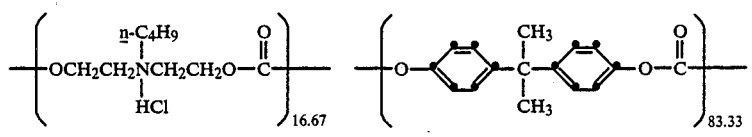

Cationic
Poly(n-butyliminodiethylene-co-4,4'-isopropylidenebisphenylene carbonate).hydrogen chloride

9.

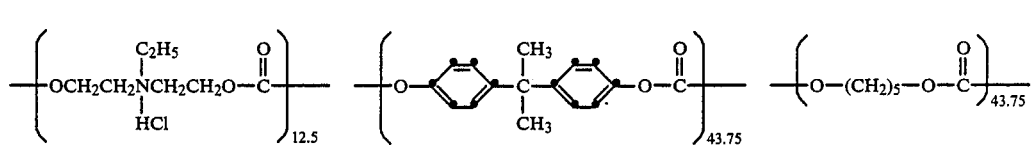

Cationic
Poly(ethyliminodiethylene-co-4,4'-isopropylidenebisphenylene-co-pentamethylene carbonate).hydrogen chloride

10.

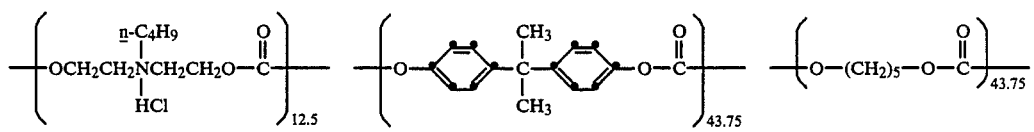

Cationic
Poly(n-butyliminodiethylene-co-4,4'-isopropylidenebisphenylene-co-pentamethylene carbonate).hydrogen chloride

11.

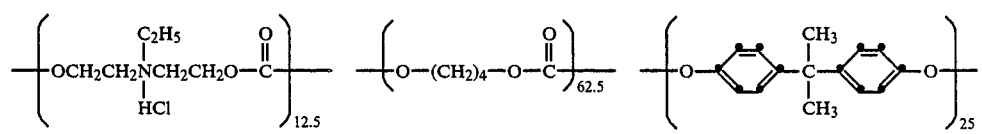

Cationic

TABLE-continued

Poly(ethyliminodiethylene-co-4,4'-isopropylidenebisphenylene-co-tetramethylene carbonate).hydrogen chloride 12.
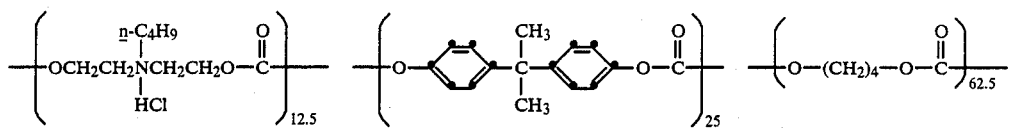

Cationic
Poly(n-butyliminodiethylene-co-4,4'-isopropylidenebisphenylene-co-tetramethylene carbonate).hydrogen chloride 13.
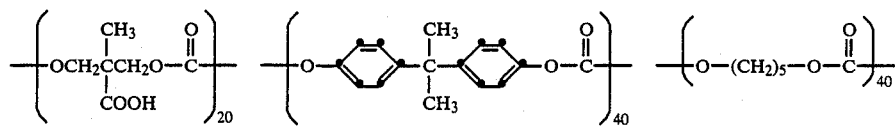

Anionic
Poly(2-carboxy-2-methyl-1,3-propylene-co-4,4'-isopropylidenebisphenylene-co-pentamethylene carbonate).

14.
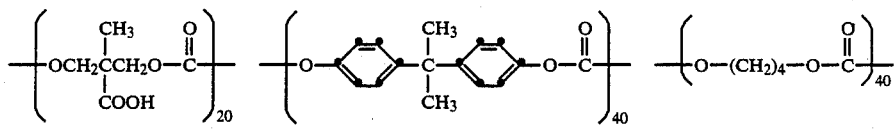

Anionic
Poly(2-carboxy-2-methyl-1,3-propylene-co-4,4'-isopropylidenebisphenylene-co-tetramethylene carbonate)

15.
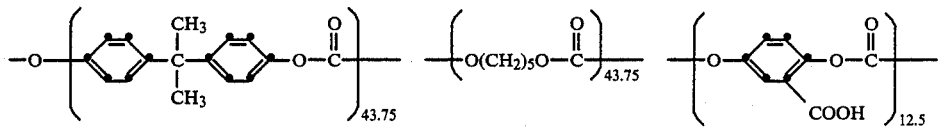

Anionic
Poly(4,4'-isopropylidenebisphenylene-co-pentamethylene-co-2-carboxy-1,4-phenylene carbonate)

16.
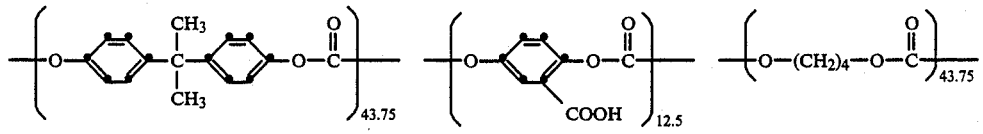

Poly(4,4'-isopropylidenebisphenylene-co-2-carboxy-1,4-phenylene-co-tetramethylene carbonate)

EXAMPLE 5

Preparation of a Cationic Polycarbonate Latex

A sample of 30 g of the polymer obtained from Example 1 were dissolved in 300 ml of tetrahydrofuran (THF) at room temperature. With gentle stirring, 200 ml of water were added to the above solution to obtain a thin blue dispersion. The solvent (THF) and part of the water were then removed on a rotary evaporator at 50° C. under aspirator vacuum to obtain a polycarbonate latex of 21.5% total solids. Electron micrographs of the latex sample showed particles to be strikingly uniform with diameters ranging from 0.02 $\mu$m to 0.025 $\mu$m. The latex was compatable with quatanary ammonium salts such as hexadecyltrimethyl ammonium bromide. The latex gave a clear coating with gelatin that is commonly used in making photographic film and papers. This means that the polymers will be compatible in photographic systems.

In a separate experiment, 11 g of polycarbonate from Example 2 were dissolved in 100 ml of acetone at room temperature, and the solution was poured into 100 ml of distilled water with good stirring. Acetone and part of the water were removed under vacuum at 50° C. to give a latex of 13.6% total solids.

No surfactants were used in either cationic latex preparation.

EXAMPLE 6

Preparation of an Anionic Polycarbonate Latex

Two grams of polycarbonate from Example 3 were dissolved in 20 ml of THF and 30 ml of acetone. The solution was quickly added to 50 ml of water with good stirring. After removing the solvents and part of the water, a latex of 13.7% total solid resulted.

The polycarbonate from Example 4 was converted to an anionic latex by similar procedures. Total solids were found to be 11%. Both latexes had average particle size diameters of about 0.1 $\mu$m.

EXAMPLE 7

Preparation of a UV dye Loaded Polycarbonate Latex

This example illustrates the use of a polycarbonate top load a UV absorbing dye for photographic application.

Thus, 1 g of UV absorbing dye

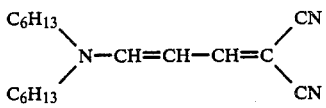

and 5 g of the polycarbonate from Example 3 were dissolved in 50 ml of THF and 50 ml of acetone. The solution was quickly added to 100 ml of water with moderate stirring. After the solvents were removed, a polycarbonate latex loaded with a UV absorbing dye, with total solids of 7.2% was obtained.

The invention has been described in detail with particular reference to preferred embodiments thereof, but it will be understood that variations and modifications can be effected within the spirit and scope of the invention.

I claim:

1. A latex composition comprising an aqueous continuous phase having dispersed therein polycarbonate particles characterized in that
   (a) the polycarbonate comprises from about 0.1 to 30 mole percent of recurring units having a carboxyl or a tertiary amine acid addition salt component, and
   (b) the polycarbonate particles are less than about 0.3 μm in diameter.

2. The latex composition of claim 1 wherein the polycarbonate has recurrring units of the structures

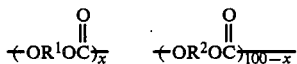

wherein

X is 0.1 to 30 mole percent;

$R^1$ represents a divalent organic group having a carboxyl or a tertiary amine acid addition salt component, and $R^2$ represents the divalent residue of a nonionic condensed diol.

3. The latex composition of claim 2 wherein $R^1$ represents N-methyliminodiethylene hydrogen chloride; 2-carboxy-2-methyl-1,3-propylene; 2-carboxy-1,4-phenylene; ethyliminodiethylene hydrogen chloride and N-butyliminodiethylene hydrogen choride; or $R^2$ represents 4,4'-isopropylidenediphenylene, tetramethylene or pentamethylene.

4. The latex compositions of claim 3 wherein the polycarbonate is selected from:

(a) Poly(4,4'-isopropylidenebiphenylene-co-N-methyliminodiethylene carbonate).hydrogen chloride;

(b) Poly(4,4'-isopropylidenebiphenylene-co-N-methyliminodiethylene-co-tetramethylene carbonate) hydrochloride salt;

(c) Poly(2-carboxy-2-methyl-1,3-propylene-co-4,4'isopropylidenebisphenylene carbonate);

(d) Poly(2-carboxy-1,4-phenylene-co-4,4'-isopropylidenebisphenylene carbonate);

(e) Poly(4,4'-isopropylidenebisphenylene-co-N-methyliminodiethylene-co-pentamethylene carbonate).hydrogen chloride;

(f) Poly(2-carboxy-1,4-phenylene-co-4,4'-isopropylidenebisphenylene carbonate);

(g) Poly(N-ethyliminodiethylene-co-4,4'-isopropylidenebisphenylene carbonate).hydrogen chloride;

(h) Poly(N-butyliminodiethylene-co-4,4'-isopropylidenebisphenylene carbonate).hydrogen chloride;

(i) Poly(N-ethyliminodiethylene-co-4,4'-isopropylidenebisphenylene-co-pentamethylene carbonate).hydrogen chloride;

(j) Poly(N-butyliminodiethylene-co-4,4'-isopropylidenebisphenylene-co-pentamethylene carbonate).hydrogen chloride;

(k) Poly(N-ethyliminodiethylene-co-4,4'-isopropylidenebisphenylene-co-tetramethylene carbonate).hydrogen chloride;

(l) Poly(N-butyliminodiethylene-co-4,4'-isopropylidenebisphenylene-co-tetramethylene carbonate).hydrogen chloride;

(m) Poly(2-carboxy-2-methyl-1,3-propylene-co-4,4'-isopropylidenebisphenylene-co-pentamethylenecarbonate);

(n) Poly(2-carboxy-2-methyl-1,3-propylene-co-4,4'-isopropylidenebisphenylene-co-tetramethylenecarbonate);

(o) Poly(4,4'-isopropylidenebisphenylene-co-pentamethylene-co-2-carboxy-1,4-phenylene carbonate);

(p) Poly(4,4'-isopropylidenebisphenylene-co-2-carboxy-1,4-phenylene-co-tetramethylene carbonate).

5. The latex composition of claims 1, 2, 3 or 4 wherein the polycarbonate is loaded with a hydrophobe.

6. The latex composition of claims 1, 2, 3 or 4 having a percent solids of 2 to 50 percent.

7. A method of making a polycarbonate latex composition having a particle size below 0.3 micron comprising the steps of:
   (a) preparing a polycarbonate comprising from about 0.1 to 30 mole percent of recurrring units having a carboxyl or a tertiary amine acid addition salt component;
   (b) dissolving the polycarbonate in a water-miscible solvent having a boiling point below about 100° C.;
   (c) blending the solution of (b) with water; and
   (d) removing the water-miscible solvent.

* * * * *

UNITED STATES PATENT AND TRADEMARK OFFICE
CERTIFICATE OF CORRECTION

PATENT NO.  : 4,824,902
DATED       : April 25, 1989
INVENTOR(S) : Tsang J. Chen It is certified that error appears in the above-identified patent and that said Letters Patent is hereby corrected as shown below:

Col. 11, line 54, the part reading:

"ethyliminodiethylene"

should read:

-- N-ethyliminodiethylene --.

Signed and Sealed this

Third Day of April, 1990

Attest:

HARRY F. MANBECK, JR.

Attesting Officer     Commissioner of Patents and Trademarks